United States Patent Office 2,928,818
Patented Mar. 15, 1960

2,928,818

PROCESS OF POLYMERIZING ETHYLENE WITH ALUMINUM-TITANIUM HALIDE CATALYST

William D. Carter and Newton H. Shearer, Jr., Kingsport, Tenn., assignors to Eastman Kodak Company, Rochester, N.Y., a corporation of New Jersey No Drawing. Application July 1, 1957
Serial No. 668,925

7 Claims. (Cl. 260—94.9)

This invention relates to an improved process for polymerizing ethylene to form solid polymers. In a specific aspect, this invention relates to an improved process for polymerizing ethylene in the presence of an aluminum-titanium halide catalyst to form solid highly crystalline polyethylene.

At the present time, the catalytic processes for preparing crystalline high molecular weight solid polyolefins fall into two general categories, namely those employing a metal oxide catalyst and those employing a metal alkyl or alkyl metal halide with a suitable activator. The metal oxide catalysts are usually used on solid supports as a catalyst bed and plugging of the catalyst bed frequently results from the coating of the catalyst with polymer. The plugging of the bed, of course, results in inactivation of the catalyst unless special precautions are taken to ensure solution of the polymer as it is formed. The metal alkyls and metal alkyl halides are expensive to prepare and are difficult to handle in commercial practice due to the fact that they ignite spontaneously on contact with air. It is, therefore, desirable to have a simple and inexpensive catalyst system whereby ethylene and similar gaseous organic hydrocarbons can be converted to high molecular weight solid polymer without the formation of low molecular weight waxy or oily polymers at relatively low pressures and temperatures.

In the copending application of Coover, Serial No. 559,536, filed January 17, 1956, there is described a process for polymerizing olefins, particularly ethylene, in the presence of a highly effective and novel catalyst for the reaction. The catalyst that is used in this process is a mixture of aluminum metal and titanium tetrahalide. This catalyst is quite effective for polymerizing ethylene and its higher homologs to highly crystalline high molecular weight solid polymers, and it is the purpose of our invention to improve upon certain aspects of polymerization procedures using this type of catalyst to make the processes more desirable commercially. For example, the polymeric product produced in this process contains in some instances a sufficient amount of catalyst to cause an undesirable discoloration of the polymer. Also in this process, it has been recognized that at low concentrations of catalyst in the reaction medium an undesirably long induction period is required prior to initiation of the polymerization reaction. This induction period, unless it is kept to a minimum, can be quite expensive in commercial operations. The length of the induction period can be reduced by increasing the quantity of catalyst employed in the process. However, as the amount of catalyst employed is increased, the discoloration of the product increases greatly. Also, in this process, as the amount of polymer in the reaction medium increases, the viscosity of the reaction medium is raised to the point where agitation becomes quite difficult and a noticeable decrease in the rate of polymerization takes place. Although the rate of polymerization decreases, the ability of the catalyst to catalyze the reaction is actually unimpaired, but it is difficult to continue the reaction further because the polymerization rate is too low.

It is an object of this invention to provide a novel and improved process for polymerizing ethylene in the presence of an aluminum-titanium halide catalyst.

It is another object of this invention to provide a novel process for polymerizing ethylene to solid crystalline polymers wherein the ratio of catalyst to polymer in the final product is at a minimum.

It is another object of this invention to provide a novel process for polymerizing ethylene to solid crystalline polymers wherein the amount of polymer produced per unit of catalyst is unexpectedly increased.

It is another object of this invention to provide a novel process for polymerizing ethylene to solid crystalline polymers wherein the necessary induction period for initiation of the reaction is maintained at a minimum while at the same time the ratio of catalyst to polymer in the product is also maintained at a minimum.

It is still a further object of this invention to provide a novel process for polymerizing ethylene to solid highly crystalline polymers wherein it is possible to continue the polymerization of ethylene in a reaction medium whose viscosity has been raised by the polymer being formed to the point where a substantial reduction in the rate of polymerization has been noted. These and other objects of this invention will be apparent from the detailed disclosure hereinbelow.

In accordance with this invention, the above objects are accomplished and high molecular weight solid crystalline polyethylene is produced by contacting etheylene with a catalyst comprising aluminum metal and titanium halide in the presence of an inert solvent to form polyethylene and after the ethylene polymerization reaction has initiated an additional amount of inert solvent is added to the reaction medium. After the polymerization reaction has been initiated the additional amount of inert solvent can be added at any time. For example, the additional solvent can be added immediately after initiation of the reaction. Alternatively, the reaction can be allowed to proceed until sufficient polymer has been formed to cause a substantial decrease in the polymerization rate and a substantial increase in the viscosity of the reaction medium. If additional solvent is added at this stage in the process, the viscosity of the reaction medium is reduced and the polymerization of ethylene can be affected at an undiminished rate. As a further alternative, the additional solvent can be added to the reaction medium gradually and in incremental amounts as the polymerization reaction progresses. This method of solvent addition is particularly applicable in continuous polymerization procedures, but it can also be used to advantage in batch processes.

In the process of our invention ethylene is converted in high yield to high molecular weight, highly crystalline solid polymers without the concomitant formation of low molecular weight waxy or liquid polymers by effecting the polymerization in the presence of a catalytic mixture of aluminum metal and a titanium tetrahalide. This combination of two materials which in themselves possess no utility for polymerizing olefins to yield low or high molecular weight liquid or solid polymers, gives results which are comparable to or better than the best catalytic processes known heretofore for making solid polymers of improved crystallinity, melting point, and rigidity. Furthermore, the two catalyst components are readily available commercially and are simple to handle in large scale manufacturing operations. Insofar as is known, aluminum metal has not been recognized as having any utility in the polymerization of olefins. Furthermore, titanium tetrachloride and similar tetrahalides have found utility only as activators for such materials as the metal alkyls which already possess utility as polymerization catalysts. The reason why the two-component mixture exhibits the high degree of catalytic activity is not readily understood and could not be predicted from the art wherein it is apparent that the catalytic activity is empirical and unpredictable. The specific nature of the catalyst combination embodying this invention is illustrated by the fact that titanium tetraalkoxides cannot be used in place of the titanium tetrahalide, even though such alkoxides have found use as alternatives for the tetrahalides in other catalytic systems. An especially advantageous aspect of the two-component catalysts in our process is that the desired solid polymer is not only formed in very high yield but that the concomitant formation of undesirable low molecular weight waxy or liquid polymer is obviated.

Aluminum metal and titanium tetrahalides are individually ineffective as catalysts for polymerization of olefins even to form liquid polymers. When the two components are employed in combination, however, the apparently synergistic mixture possesses a high degree of activity at temperatures as low as room temperature or lower and at pressures as low as atmospheric pressure. The relative proportions of the two components can be varied quite widely, although best results are obtained when the titanium tetrahalide is employed in an amount of from 1 to 6 molar equivalents per gram atom of aluminum metal. Higher concentrations of the titanium tetrahalide can be employed but are usually not necessary and lead to a decrease in the molecular weight of the polymer. At lower relative concentrations of the titanium tetrahalide, the polymerization rate is slower so that such lower concentrations of titanium tetrahalide are generally less desirable for commercial practice.

Our process thus employs, as catalyst components, materials which are readily available, inexpensive and easy to handle in commercial practice since they do not ignite spontaneously on contact with air. This latter is a particular advantage when dealing in large scale operations with highly flammable ethylene. The catalyst mixtures that can be used in our process include any of the two-component catalyst mixtures of aluminum metal with titanium tetrachloride or other tetrahalide. Titanium tetrabromide can be used interchangeably with the titanium tetrachloride without greatly lessening the catalytic activity. The other titanium tetrahalides such as titanium tetraiodide can be used but are somewhat less desirable.

Any form of aluminum metal can be used, although it is preferably in flake or finely divided form for optimum activity, rapid polymerization and high yield of polymer. When a granular aluminum of commerce is employed, it is desirable to clean the surface of the granules with an acid or acid mixture, such as a mixture of nitric and hydrofluoric acids, or with a base, or with a reducing agent, for optimum results, although this is not essential for use of the granules. It is preferred to use a finely divided aluminum metal, such as aluminum flakes or powder, since the forms available commercially need not be cleaned for rapid polymerization and high yields of polymer.

The polymerization reaction is carried out in liquid phase in an inert organic liquid, and preferably an inert liquid hydrocarbon vehicle, and the removal of catalyst is facilitated by operating below the melting point of the polymer. The process proceeds with excellent results over a relatively wide temperature range with temperatures of 20–200° C. being preferably employed, and particularly good results being obtained in the range of 40–160° C. The preferred temperature range is 50–110° C. The pressure can be varied as desired, with pressures as low as atmospheric pressure being operable. Generally speaking, however, it is desirable to employ a pressure in the range of 0–1000 p.s.i.g. with pressures of from 10 to 1000 p.s.i.g. being preferred for optimum yields. In some cases, higher pressures such as are employed in the conventional high pressure processes can be used but are usually not necessary. Thus, pressures of as much as 20,000 p.s.i.g. or higher can be used in some instances. The liquid vehicle employed is desirably one which serves both as a liquid medium and a solvent for the solid polymerization products at the temperature of polymerization. The great increase in polymerization rate with increasing pressures makes the use of pressures of 300–500 p.s.i.g. desirable.

The invention is applicable for polymerizing ethylene to a highly crystalline high molecular polymer. The polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make is possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetraline at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

Polyethylene prepared in accordance with our process can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process.

The catalyst mixtures used in our process have several important advantages over the prior art catalysts. For example, the rate of polymerization is much faster than is ordinarily achieved with catalysts known heretofore, and the same degree of polymerization can be achieved in a few hours using the present catalyst system as required several days heretofore. Another advantage of these catalysts is that relatively lower pressures can be used with pressures as low as atmospheric pressure being operable. Ordinarily, moderate pressures of the order of 10–1000 p.s.i.g. are employed, but the use of such pressures still allows considerable economy over the conventional high pressure processes which operate in the range of 1000-2000 atmospheres in most cases. A furthur important advantage is the high yield of solid high density polymer without the concomitant formation of waxy, greasy or oily polymers.

The only limitation on the temperature at which our process is effected is the decomposition temperature of the catalyst. The pressure employed need be only sufficient to maintain the reaction mixture in liquid form during the polymerization, although moderate pressures are desirable for optimum yield. Since the catalyst mixture employed consists of components which are either readily soluble or readily dispersible in the organic liquid vehicles commonly employed, the uniformity of reaction can be readily controlled. The exact nature of the catalytic action between the components of the mixture is not wholly understood, and particularly the reason why the mixture has such greatly increased activity is not understood. The catalyst can be separated from the polymer by any of several methods. A convenient method is to wash the product in methanol, dissolve the polymer in a xylene-2-ethylhexanol mixture and reprecipitate the polymer by cooling the solution. The reprecipitated polymer is then filtered, heated with methanolic hydrochloric acid to remove unreacted metal and washed free of acid with methanol. Alternatively, the crude polymer can be washed with methanol, heated with dilute solutions of sodium hydroxide and methanol, and finally washed with methanol and water. Either sequence affords completely colorless polymer.

The polymerization of ethylene in our process ordinarily is accomplished by admixing the components of the polymerization mixture, i.e. the liquid solvent and catalyst, and introducing gaseous ethylene to the mixture. The amount of solvent employed can be varied over rather wide limits with relation to the monomer and catalyst. Best results are obtained using a concentration of catalyst of from about 0.01 to about 10% by weight and desirably 0.1 to 5% by weight in the vehicle. At the lower catalyst concentrations an unduly long induction period has been observed prior to initiation of the reaction. The length of the induction period can be decreased by increasing the amount of catalyst used, but greater amounts of catalyst are expensive and lead to undesirable discoloration of the polymer product. With our invention the polymerization reaction is begun using a catalyst concentration that requires only a relatively short induction period, and, after the reaction has begun, additional solvent is added to the reaction medium. The amount of catalyst used in the reaction is such that, if the total solvent had been charged to the reactor prior to initiation of the reaction, the induction period would have been undesirably long. In fact, in some instances no reaction would have occurred. However, by employing our invention the induction period is substantially reduced without any increase in the total amount of catalyst used in the process. This outstanding improvement can be noted by comparing Examples 1 and 2. In Example 1 a total of 80 pounds of solvent and 60 grams of catalyst were used in our polyethylene process. However, only 40 pounds of solvent and 60 grams of catalyst were charged to the reactor initially and 40 more pounds of solvent were added after the reaction had been initiated. When proceeding in this manner a 4-hour induction period was required and 55 pounds of polyethylene were produced. In Example 2 equivalent amounts of catalyst and solvent were used, but the total solvent was charged to the reactor initially, and after 24 hours no polymerization had occurred. Although a longer induction period could have been used, 225 grams of additional catalyst were added to the reactor to initiate polymerization, and with the greatly increased catalyst concentration only 45 pounds of total polymer having an objectionable color were produced.

It is one of the outstanding features of our process that it is possible to decrease the amount of catalyst used in the reaction and at the same time increase the amount of polymer produced in the process. It is completely unexpected that by practicing our process it would be possible to increase the yield of product and that the high polymer to catalyst ratios we have observed could be achieved.

It is another notable advantage of our process that the polymerization reaction can be continued to form additional quantities of polymer after the reaction has normally been considered as at an end. Heretofore, it has been the practice to charge the solvent and catalyst to the reactor and then to proceed with the polymerization until the reaction mixture becomes so viscous that it is difficult to agitate and the polymerization rate has decreased substantially. At this stage in our process the reaction is not considered as at an end. Additional solvent is added to the reaction mixture and the reaction can be continued by the addition of ethylene to the reactor without adding any additional catalyst. This feature of our process also leads to a product having unexpectedly high polymer to catalyst ratios and to increased yields of polymer per unit of catalyst while at the same time reducing the amount of catalyst used in the process.

The catalyst concentrations in the solvent discussed above represent the total amount of catalyst used in the process. In practicing our invention approximately nine-tenths to one-tenth or less of the total solvent will be employed in the reaction until polymerization has begun. Under these conditions the initial concentration of catalyst in the solvent is substantially greater than the ultimate or final catalyst concentration.

Although temperatures ranging from 20° C. to 200° C. can be employed as desired, the usual process adapted for commercial production is carried out at a temperature in the range of from 50° C. to 110° C. for best results. In the preparation of uniform polymers by a continuous process, the temperature is desirably maintained at a substantially constant value within the preferred range in order to achieve the highest degree of uniformity. Since it is desirable to employ a solution of the monomer of relatively high concentration, the process is desirably effected under a pressure of from 10 to 1000 p.s.i.g. obtained by pressuring the system with the monomer being polymerized. The polymerization time can be varied as desired from a period of a few minutes or hours to several days. When a continuous process is employed, the contact time in the polymerization zone can also be regulated as desired, and in some cases it is not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzene, mono and dialkyl napthalenes, n-pentane, n-octane, iso-octane, methyl cyclohexane, tetralin, decalin, and any of the other well known inert liquid hydrocarbons.

The following examples are illustrative of the practice of our invention.

Example 1

In a 20-gallon stainless steel reaction kettle equipped with a high-speed Cowles dissolver type stirrer were placed 40 pounds of dry heptane, 7.5 g. of aluminum powder; and 52.5 g. of titanium tetrachloride. During this operation the reaction kettle was kept under an atmosphere of dry nitrogen. Extreme care was taken to insure the absence of both air and moisture during the polymerization. Stirring was initiated and dry ethylene was admitted and maintained under 40 p.s.i. gauge pressure. The mixture was heated to 90° C. and maintained there for a 4-hour induction period after which the polymerization started. The temperature was then lowered gradually over a 1-hour period to 50° C. After a period of two hours at 50° C., a total of 15 pounds of polyethylene had formed, and the slurry had become quite thick. An additional 40 pounds of dry heptane was slowly metered in over a 3-hour period while the polymerization continued at 50° C. The polymerization was continued for an additional three hours after which 45 pounds of polyethylene had formed. The catalyst was still active at this point, but the reactor was virtually full and the polymerization rate was consequently dropping.

The reaction product was then washed four times with dry isopropanol under high speed stirring and at 75° C. Then the polymer was washed three times with water containing 10% isopropanol maintained at 95° C. The resulting product was dried in a circulating air oven. The white powder could be readily molded into colorless plates at 150° C. The polyethylene had a melt index of 0.39. The ash content of the polyethylene was 0.04%. The yield in this case was 345 parts of polyethylene per part of total catalyst used.

Example 2

When the polymerization was carried out with the amounts of catalyst used in Example 1 and using the entire 80 pounds of heptane solvent at the beginning of the reaction, no polymerization could be initiated even after 24 hours' heating at 90° C.

It was necessary to increase the quantity of aluminum to 15 g. and the quantity of titanium tetrachloride to 210 g. in order to get the polymerization started when the 80 pounds of heptane was present from the start. In this case the 45 pounds of polyethylene produced showed an objectionable brown color when molded into a plate, even though it was washed in the same manner as described in Example 1. The ash content of this product was 0.13% and the melt index was 2.5. The yield of polyethylene was only 91 parts per part of total catalyst used.

Example 3

The procedure of Example 1 was followed with the exception that the major part of the polymerization was carried out at 70° C. rather than 50° C. A 45-lb. yield of colorless polyethylene of melt index 2.39 was obtained.

Example 4

The procedure of Example 1 was followed using 7.5 g. of aluminum powder, 65.6 g. of titanium tetrachloride and carrying out the polymerization at 70° C. The melt index of the product in this case was 5.7. The yield was again 45 lb. of colorless polyethylene.

Example 5

The procedure described in Example 1 was used, starting with 60 lb. of dry heptane and with 10 g. of aluminum powder and 140 g. of titanium tetrachloride as catalyst. An additional 20 lb. of dry heptane was added after 25 lb. of polyethylene had formed. The polymerization was initiated at 90° C. as described in Example 1 and then the temperature was lowered to 70° C. after an induction period of 4.5 hours. The 45 pounds of colorless polyethylene which was produced had a melt index of 9.1.

The catalysts employed in the practice of this invention can, if desired, be subjected to an activation treatment prior to use in the polymerization process. For example, particularly desirable results have been observed when aluminum-titanium tetrachloride mixtures are heated at temperatures of at least 90° C. and preferably at least 150° C. and higher. The resulting heat-treated mixture containing aluminum and titanium tetrachloride can be used to produce improved polyethylene yields per part of catalyst. The pretreatment time is variable and dependent upon the temperature employed. For example, at a temperature of about 135° C. a pretreatment time of 36 to 48 hours is desirable while at temperatures up to 210 to 220° C. a pretreatment time of 1 to 2 hours is usually sufficient.

We claim:

1. The process for producing high molecular weight crystalline polyethylene which comprises contacting ethylene with a catalyst initially containing as essential components aluminum metal and from 1 to 6 molar equivalents of titanium tetrachloride per gram atom of aluminum in the presence of not more than about one-half the total amount of heptane to be used in the process at a temperature within the range of 20 to 200° C. and a pressure within the range of 10–1000 p.s.i.g., and after ethylene polymerization has been initiated adding additional heptane to the reaction mixture, the concentration of catalyst in the total amount of heptane being within the range of 0.1 to 5% by weight.

2. The process for producing high molecular weight crystalline polyethylene which comprises contacting ethylene with a catalyst initially containing as essential components aluminum metal and from 1 to 6 molar equivalents of titanium tetrachloride per gram atom of aluminum in the presence of not more than about one-half the total amount of heptane to be used in the process at a temperature within the range of 20 to 200° C. and a pressure within the range of 10–1000 p.s.i.g., and after ethylene polymerization has been initiated gradually adding additional heptane to the reaction mixture in increments, the concentration of catalyst in the total amount of heptane being within the range of 0.1 to 5% by weight.

3. The process for producing high molecular weight polymers of ethylene which comprises polymerizing ethylene to solid polymer in the presence of a catalyst initially containing as essential components aluminum metal and titanium halide and in the presence of from one-tenth to nine-tenths of the total amount of inert liquid solvent to be used in the process, and after ethylene polymerization has been initiated adding additional inert liquid solvent to the reaction mixture, the concentration of catalyst in total solvent being within the range of 0.01 to 10% by weight.

4. The process for producing high molecular weight polymers of ethylene which comprises polymerizing ethylene to solid polymer in the presence of a catalyst initially containing as essential components aluminum metal and titanium tetrachloride and in the presence of from one-tenth to nine-tenths of the total amount of inert liquid solvent to be used in the process, continuing ethylene polymerization until the reaction mixture increases substantially in viscosity and the rate of ethylene polymerization decreases substantially, adding additional inert liquid solvent to said reaction mixture of increased viscosity and introducing additional ethylene to resulting reaction mixture to form additional polyethylene, the concentration of catalyst in total liquid solvent being within the range of 0.01 to 10% by weight.

5. The process for producing high molecular weight crystalline polymers of ethylene which comprises polymerizing ethylene to solid polymer in the presence of a catalyst initially containing as essential components aluminum metal and titanium tetrachloride and in the presence of not more than about one-half the total amount of normally liquid hydrocarbon solvent to be used in the process, and after ethylene polymerization has been initiated adding additional liquid hydrocarbon solvent to the reaction mixture, the concentration of catalyst in total hydrocarbon solvent being within the range of 0.01 to 10% by weight.

6. The process for producing high molecular weight crystalline polymers of ethylene which comprises polymerizing ethylene to solid polymer in the presence of a catalyst initially containing as essential components aluminum metal and titanium tetrachloride and in the presence of not more than about one-half the total amount of normally liquid saturated aliphatic hydrocarbon solvent to be used in the process at a temperature within the range of 20–200° C. and a pressure within the range of 10–1000 p.s.i.g., and after ethylene polymerization has been initiated adding additional hydrocarbon solvent to the reaction mixture, the concentration of catalyst in total hydrocarbon solvent being within the range of 0.01 to 10% by weight.

7. The process for producing high molecular weight crystalline polymers of ethylene which comprises polymerizing ethylene to solid polymer in the presence of a catalyst initially containing as essential components aluminum metal and titanium tetrachloride and in the presence of not more than about one-half the total amount of normally liquid saturated aliphatic hydrocarbon solvent to be used in the process at a temperature within the range of 20–200° C. and a pressure within the range of 10–1000 p.s.i.g., and after ethylene polymerization has been initiated adding additional hydrocarbon solvent to the reaction mixture, the concentration of catalyst in total hydrocarbon solvent being within the range of 0.1 to 5% by weight.

References Cited in the file of this patent

UNITED STATES PATENTS

| | | |
|---|---|---|
| 2,825,721 | Hogan et al. | Mar. 4, 1958 |
| 2,845,414 | Schutze | July 29, 1958 |

FOREIGN PATENTS

| | | |
|---|---|---|
| 1,132,506 | France | Nov. 5, 1956 |
| 1,147,868 | France | June 11, 1957 |
| 1,149,945 | France | July 29, 1957 |
| 770,507 | Great Britain | Mar. 20, 1957 |